United States Patent
Thum-Jaeger et al.

(10) Patent No.: US 10,567,106 B2
(45) Date of Patent: Feb. 18, 2020

(54) SYSTEM AND METHOD FOR JAMMING A TARGET ACQUISITION

(71) Applicant: HENSOLDT Sensors GmbH, Taufkirchen (DE)

(72) Inventors: Andrea Thum-Jaeger, Neufahrn bei Freising (DE); Oliver Rudow, Ottobrunn (DE); Ulrich Martin, Taufkirchen (DE)

(73) Assignee: HENSOLDT Sensors GmbH, Taufkirchen (DE)

( * ) Notice: Subject to any disclaimer, the term of this patent is extended or adjusted under 35 U.S.C. 154(b) by 0 days.

(21) Appl. No.: 16/254,270

(22) Filed: Jan. 22, 2019

(65) Prior Publication Data

US 2019/0229835 A1     Jul. 25, 2019

(30) Foreign Application Priority Data

Jan. 22, 2018 (EP) .................................. 18152808

(51) Int. Cl.
| | |
|---|---|
| *G01S 7/495* | (2006.01) |
| *H04K 3/00* | (2006.01) |
| *F41H 13/00* | (2006.01) |
| *F41G 7/22* | (2006.01) |

(Continued)

(52) U.S. Cl.
CPC ............. *H04K 3/65* (2013.01); *F41G 3/147* (2013.01); *F41G 7/224* (2013.01); *F41H 13/005* (2013.01); *G01S 7/495* (2013.01); *H04K 3/41* (2013.01); *H04K 3/44* (2013.01); *H04K 3/45* (2013.01); *H04K 3/822* (2013.01); *F41H 3/00* (2013.01); *H04K 2203/14* (2013.01); *H04K 2203/24* (2013.01)

(58) Field of Classification Search
CPC .. H04K 3/22; H04K 3/45; H04K 3/41; H04K 2203/24; H04K 2203/14; H04K 3/822; H04K 3/44
See application file for complete search history.

(56) References Cited

U.S. PATENT DOCUMENTS

| | | |
|---|---|---|
| 6,007,218 A | 12/1999 | German et al. |
| 6,190,022 B1 | 2/2001 | Tocci et al. |
| 7,040,780 B2 | 5/2006 | Diehl |

(Continued)

FOREIGN PATENT DOCUMENTS

| | | |
|---|---|---|
| EP | 0 665 445 A1 | 8/1995 |
| WO | WO 2005/045465 A1 | 5/2005 |

OTHER PUBLICATIONS

European Search Report issued in European counterpart application No. 18152808.4-1011 dated Jul. 9, 2018, with Statement of Relevancy (Eight (8) pages).

*Primary Examiner* — Keith Ferguson
(74) *Attorney, Agent, or Firm* — Crowell & Moring LLP

(57) ABSTRACT

A system for jamming a target acquisition, which starts at a position and may be detected by a detector that provides a detection signal in response to the target acquisition includes a warning device for outputting a warning, in case the detector outputs a detection signal. The system also includes an optical jammer configured to provide at least one jamming signal, and a directing device configured to direct the jamming signal towards the position in response to the output warning in order to prevent target acquisition or at least to make target acquisition more difficult.

15 Claims, 2 Drawing Sheets

(51) Int. Cl.
*F41G 3/14* (2006.01)
*F41H 3/00* (2006.01)

(56) References Cited

U.S. PATENT DOCUMENTS

| 2007/0205366 A1* | 9/2007 | Gidseg | F41G 7/224 |
| | | | 250/348 |
| 2010/0126335 A1* | 5/2010 | Saban | F41G 7/224 |
| | | | 89/36.01 |
| 2017/0192089 A1 | 7/2017 | Parker et al. | |

* cited by examiner

SYSTEM AND METHOD FOR JAMMING A TARGET ACQUISITION

FIELD OF THE INVENTION

The present invention relates to a system and a method for jamming a target acquisition and in particular to an optical system for inhibiting continuous target tracking.

BACKGROUND

Guided missiles using a semi-automatic control (a so-called SACLOS; semi-automatic command to line of sight) represent a threat, in particular for land vehicles, but also for platforms, which are flying at low speed, as for example helicopters. For example, at such guided missiles a shooter is targeting a target by using a sighting optics and guides the guided missile into the target. The sighting optics communicates with the control electronics of the guided missile and transfers any required steering commands. Here, the shooter is continuously tracking his/her target by staying in visual contact with the missile. Communication with the guided missile may be performed by wire, for example. However, in other systems it is also possible to ensure a connection by means of radio, radar or laser. In the latter case this involves a so called laser beam rider (so called beam rider). In these steering methods a direct steering is thus performed by the shooter, who is targeting the target by means of a sighting optics, as mentioned above, and correspondingly steers the guided missile into the desired target. Such a target acquisition by the opponent constitutes a threat which is to be prevented as far as possible.

In order to meet said threat, there are a variety of conventional systems which are non-lethal and are intended for direct use at a short distance. For example, U.S. Pat. Nos. 6,007,218 and 6,190,022 disclose laser or LED systems which cause a temporary visual disturbance by dazzling or flashing. U.S. Pat. No. 7,040,780 discloses a laser weapon which comprises a plurality of laser sources, overlays them and achieves a dazzling effect in predetermined regions in a targeted way.

However, the systems disclosed here are insufficient and there is a demand for alternative systems, which detect a target acquisition by an opponent or a continuous target tracking in a reliable and independent way, but also prevent or at least disturb target tracking, respectively.

SUMMARY

At least a part of the problems mentioned above is solved by the system according to claim 1 and a method according to claim 10. The dependent claims further define advantageous embodiments of the system.

The present invention relates to a system which is adapted to jam a target acquisition, which starts at a position and is detectable by a detector. The detector provides a detection signal in response to the target acquisition. The system comprises:
- a warning device for outputting a warning based on the detection signal (for example, in case the detector outputs a detection signal);
- an optical jammer configured to provide at least one jamming signal; and
- a directing device configured to direct the jamming signal towards the position in response to the output warning in order to prevent the target acquisition or to make target acquisition at least more difficult.

Here, the position may be a location or a place of an object, a human being or a device, who/which performs target acquisition. In particular, the position may be a location of a sighting optics or of an optical system which is positioned in a certain distance and direction to the system.

Optionally, the optical jammer is configured to provide a multispectral light signal, in particular a pulsed or continuous laser signal, as jamming signal, wherein the optical jammer provides the jamming signal using wavelengths which may be varied by switchable wavelengths (in an arbitrary way) (for example by predetermined filters). For example, the multispectral light signal comprises several colors, but may also include a spectral part from the non-visual range (for example, an infrared light from the near, middle or far infrared).

Optionally, the optical jammer is configured to provide the jamming signal having a wavelength, intensity or pulse rate which results in a reduction of contrast at target acquisition. As a result, the shooter is not able to perceive the potential target any longer. In case a camera is used for target acquisition, it will be overlaid or no structures will be recognizable due to lacking contrast.

Optionally, the system further comprises a means for determining a spectral radiation range from a spatial region (for example, a spectrum analyzer). The detected spatial region is for example opposite to a direction in which the directing device is adapted to direct the jamming signal. This way, the spectral range of the background is also detected. In addition, the optical jammer may also change the jamming signal depending on the determined spectral range (for example, radiate in the same spectral range). This way, a camouflage may be realized in front of the background.

Optionally, the system further comprises a distance meter device, which is configured to determine a distance to the position of the target acquisition. The optical jammer may be configured to change the jamming signal depending on the measured distance. For example, the intensity may be aligned to cause no damage to the eyes of a potential shooter. Optionally, it is also possible to determine the position or the location of the shooter (for example, by additionally acquiring the azimuth and elevation angles). Furthermore, the distance meter device may perform the measurement of the distance before jamming the target acquisition, and based on the determined distance, the intensity, color, etc., for example, of the jamming signal may be adapted in order to protect the eyes of a potential shooter.

Optionally, a directing device is configured to track stationary, flying, or moving objects during the movement thereof and to direct the jamming signal towards the moving object during a minimum period of time. In addition, the directing device may be configured to conceal a location of at least one component of the system by beam deflection.

Optionally, the detector is part of the system.

Optionally, the system or the detector comprises at least one of the following components:
- a muzzle fire detector,
- a missile warning unit for detecting approaching flying objects,
- a laser warning system for detecting laser-guided missiles,
- a scanning laser system for detecting sighting devices by retroreflection of the emitted laser beam.

Optionally, the scanning laser system is configured to provide the laser beam thereof as a jamming signal to the system. The optical jammer, the directional device, and the detector may also form the scanning laser system. The scanning laser system may further be configured to intermittently scan a region by a laser scan, and the detector may be configured to identify a retroreflection during the laser scan from an optical device which is potentially used for target acquisition, as detection signal.

Exemplary embodiments of the present invention also relate to a method of jamming a target acquisition, with starts at the position and which is detectable by a detector. The detector again returns a detection signal in response to the target acquisition. The method comprises the steps:
- outputting a warning, in case the detector outputs a detection signal; and
- in response of outputting the warning, directing a jamming signal towards the position in order to prevent target acquisition or to make target acquisition at least more complicate.

Exemplary embodiments of the present invention thus provide a complete automatic defense chain in order to interfere with a target acquisition or make any target acquisition impossible. Exemplary embodiments solve at least a part of the technical issues mentioned above by irritating a shooter or an optical recording system (for example, a camera) by flickering light or light which is varied in color, and thus an exact target acquisition becomes impossible.

The automated system including the optical jammer also comprises a warning system for recognizing the threat, for example a multispectral laser or multispectral light source (as for example, a multispectral LED array) as radiation source, and in addition a directing system which is adapted to instruct and align the light source so that a suitable modulation of the exemplary laser light of the shooter or of the optical target acquisition system is at least irritated and prevented from exact target tracking.

Advantages of exemplary embodiments result in particular from to the fact that the multispectral light of the jamming signal lowers the contrast of the scenery (which the shooter or the optical target acquisition system is perceiving) to a degree which makes target tracking impossible. In particular, this is achieved/ensured by the following features:
- the colors of the light are constantly changing, thus it is impossible to hide a respective color (for example, by a respective filter).
- the constantly changing colors have a multiplication effect on contrast reduction or the dazzling effect.
- by the multispectral light it is also possible to cover various spectral ranges, as for example the visible spectrum of light, near infrared or middle infrared or other spectra. Thus also cameras or other optical detection devices which work in other spectral ranges may be prevented from optical acquisition due to the dazzling effect.

BRIEF DESCRIPTION OF THE FIGURES

The exemplary embodiments of the present invention will be better understood by referring to the following detailed specification and the appended figures of the various exemplary embodiments, however it is not intended to limit the disclosure to the specific embodiments, but they shall provide only a description and facilitate understanding.

DETAILED DESCRIPTION

Figure 1:
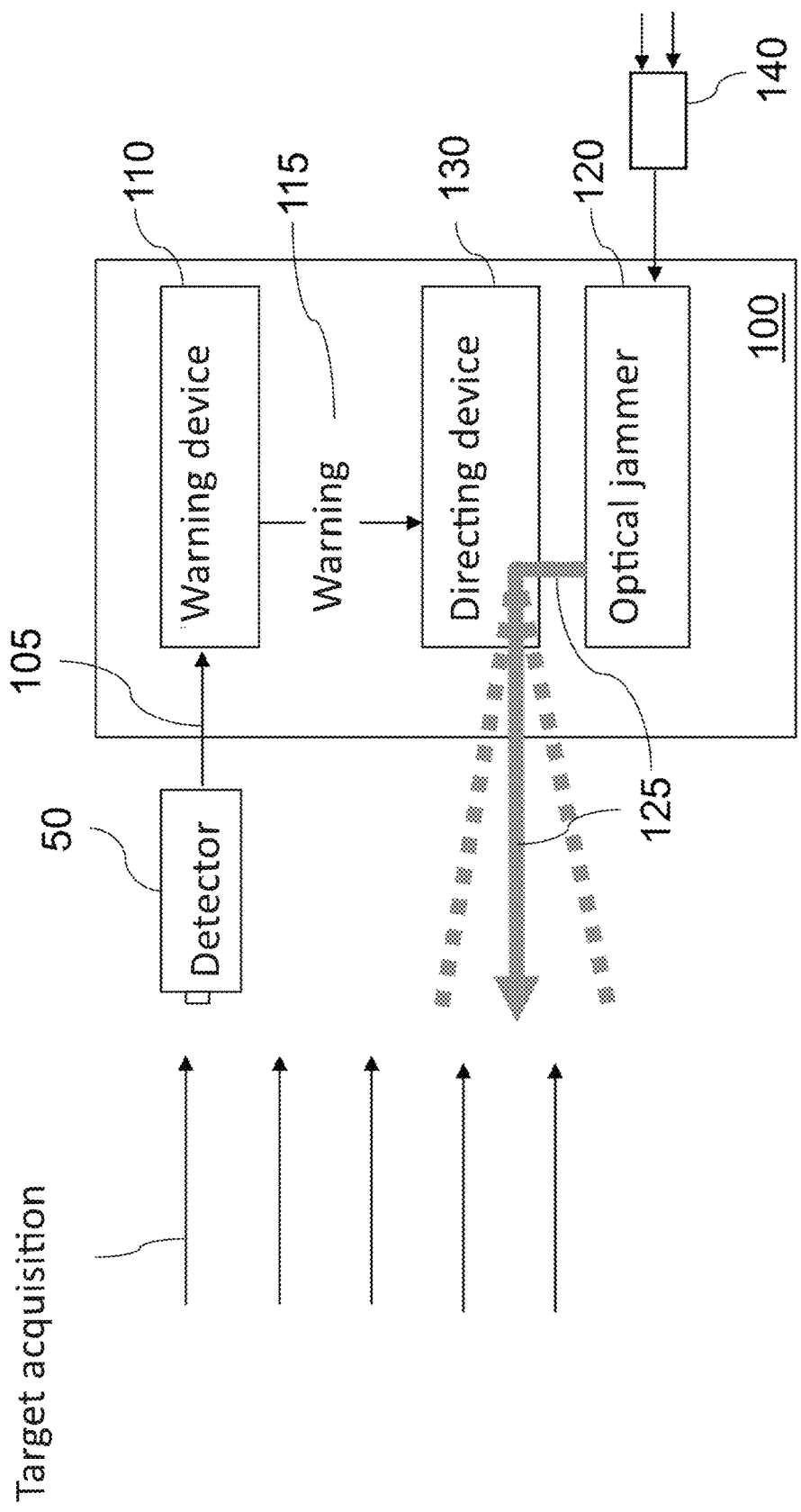
FIG. 1 shows a system for jamming a target acquisition according to an exemplary embodiment of the present invention.

FIG. 1 shows a system 100 for jamming a target acquisition according to an exemplary embodiment of the present invention. Target acquisition starts at a position and is detectable by a detector 50. The detector 50 provides a detection signal 105 in response to the target acquisition. The system 100 comprises: a warning device 110 for outputting a warning 115, an optical jammer 120, and a directing device 130. The warning device 110 includes an input for the detection signal 105 of the detector 50. The optical jammer 120 is configured to provide at least one jamming signal 125, and the directing device 130 is configured to direct the jamming signal 125 towards the position of the target acquisition in response to the output warning 115 in order to prevent the target acquisition or to make target acquisition at least more difficult.

Optionally a device 140 for determining a spectral radiation range may be provided from a spatial region (as part of the system 100 or separately), wherein the spatial region in particular comprises the background, that is the region opposite to the region from which the target acquisition is performed. The device 140 may in particular comprise a spectrum analyzer or an optical recording device (for example, a camera) which is adapted to determine the background spectrum (in the direction of target acquisition). Based on the analysis of the device 140, the optical jammer 120 may spectrally adapt the jamming signal 125 to the background, thus realizing an effective camouflage (in general, the potential shooter perceives only the background).

The warning device 110 serves to identify the threat and, for example, comprises at least one of the following warning devices: a missile warning devices, a laser warning device, a so-called sniper detector. In further exemplary embodiments, the detector 50 is part of the warning device 110 and thus triggers a warning 115 to automatically cause the system 100 to emit the jamming signal 125. However, the warning system 110 may also delay the activation of the optical jammer 120/the directing device 130 in order to first enable an assessment of the threat level (for example, by visual inspection) and cause emittance of the jamming signal 125 only after confirmation.

The system 100 may comprise an optional distance meter device (not shown in FIG. 1). The optional distance measurement may monitor the distance to the threat (to the sighting optics) constantly or when required, and adjust the dazzling affect in an adaptive way by taking the distance into account.

Figure 2:
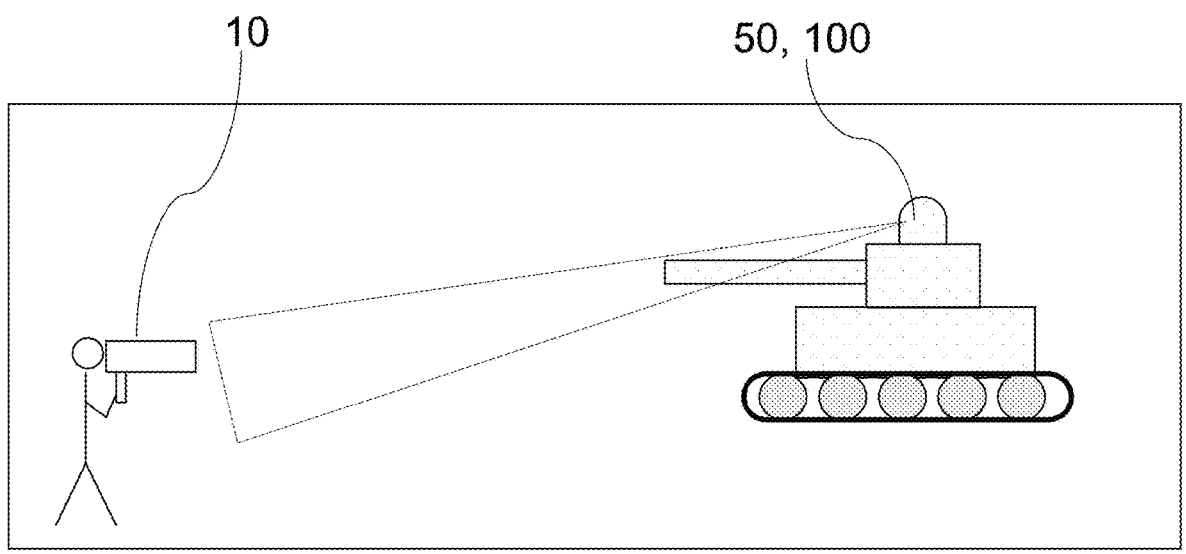
FIG. 2 shows a possible usage variant of the system where target acquisition is performed by a shooter.

FIG. 2 shows a possible usage variant of the system 100, where a target acquisition is performed by a shooter or a sighting device 10. After the detector 50 has detected the target acquisition, the jamming of the shooter 10 may be performed in order to thus prevent target tracking by the shooter 10. As described above, the warning device 110 alerts the optical jammer 120, which then creates the jamming signal 125 and aligns it towards the shooter by means of the directing device 130 in order to prevent the shooter from target tracking (no individual components are shown in FIG. 2).

According to exemplary embodiments, the optical jammer 120 comprises a multispectral laser, a multispectral LED or a LED array as light or radiation sources, which may be an integrated component of the system 100. However, also an external radiation source may be used. The optical jammer 120 may also comprise a respective control electronics in order to modulate the light in an adequate way.

Light sources in the optical jammer 120 may for example be modulated in a way that a dazzling effect, a camouflage effect (disappearing of any contrasts in front of the background), an irritation or other effects (for example, sickness) may be caused at the shooter, whereby target tracking is made impossible or becomes at least more difficult. In addition it is also possible to vary the wavelength of the optical jammer 120, which results in light signals having different colors, and makes countermeasures, as for example laser safety glasses, more difficult. If the wavelength of the jamming signal is continuously varied, a broadband filter would have to be used, which would result in filtering out any light, and a shooter would not have any visual contact any more.

It is also possible that the location of the directional device 130 or of the optical jammer 120 is concealed. In particular, an active camouflage may be performed, for example by beam deflection (so-called scanning or switching). Thus, for example, the jamming signal 125 may be emitted from different positions at the same time, constantly successively in time, or variably over time.

However, it is not mandatory that target acquisition (or target tracking) is performed by a shooter 10. The target acquisition or target tracking may also be performed by a sighting device or an optical recording device, as for example a camera, without the need of any human interaction.

The directing system 130 serves to instruct and to align the jamming signal 125. In particular, directing of the jamming signal 125 to the recognized target 10 (potential shooter) may automatically be performed by means of the directing system 130. The directing device 130 is for example configured to align the jamming signal 125 to a sighting optics of an exemplary weapon system to achieve a dazzling effect independently of the fact whether a shooter or a camera system is positioned behind the sighting optics 10.

In exemplary embodiments the directional device 130 and/or the jamming signal 125 is configured to achieve the dazzling effect at the shooter or the optical recording device used. The dazzling effect may for example cause an overstimulation or a removal of a stimulus, for example by a modulated signal. As a result, the contrast of the complete scenery is at least reduced. This way, the exemplary shooter or the optical recording device is also not able to identify and track the target any more. It is also possible to choose the jamming signal 125 in a way which causes a lack of concentration at the shooter. As a result, the shooter is not able to constantly track his/her target anymore during the attack, thus the attack has to be canceled.

The modulation (for example a changing brightness, color, pulse frequency, etc.) of the jamming signal 125 causes the eye or the camera to constantly align the individual reception range to the respective light source. This may result at the camera, for example, to a reduction or rise of the gain of the receiver. A rise may for example be triggered by temporarily switching off the jamming signal. Such changes may continuously be performed, so that the system or the eye of the shooter has to adapt itself all the time. In each case it may be achieved that the actual target may not be perceived anymore. However, also without said changing conditions, a reduction of contrast makes target acquisition impossible.

The exemplary spectrum analyzer 140 detects the potential background and determines the spectral wavelength distribution of the background (spectral analysis) which the shooter 10 perceives, wherein the background is positioned opposite to the direction of emission of the jamming signal 125. Based on that, the jamming signal 125 may be adapted to the background in a radiometric way, so that a contrast reduction against the background is permanently achieved. This way, the jamming signal 125 may be adaptively aligned with the background (spectrally), so that the jamming signal 125 has the same or a similar wavelength as a spectral component of the background radiation (for example, in a spectral range which is mainly existing in the background). Thus, the system or the object (for example, an airplane, water vehicle, or land vehicle) on which the system is installed may not be recognized in front of the background or may hardly be recognized.

In further exemplary embodiments, contrast reduction may be performed for a longer period of time or permanently, in particular in a determined spectral range. For example, the jamming signal may be constantly activated in the UV or blue spectral range in order to reduce the contrast of a platform against the sky or the water (for example, for flying objects or ships).

In further exemplary embodiments it is also possible to irritate snipers or shooters on RPGs (grenades driven by rockets) by means of the jamming signal, thus the line of sight thereof to the target is blocked, or target acquisition becomes impossible due to lacking contrast caused by the jamming signal.

In addition, it is possible to use a determined flickering light (for example, as a pattern) or a light which is varying in color as jamming signal which has a dazzling effect or at least irritates the shooter.

In further exemplary embodiments, the system 100 and the optical jammer 120 are part of the protection system having an integrated target acquisition which automatically provides the following features:

identifying a sniper by a detector 50, which detects the muzzle fire of the rifle (a so-called muzzle fire detector), for example, identifying a sniper by a scanning laser system, which for example uses retroreflections of a telescopic sight in order to recognize the shooter (so-called sniper detectors or glint detectors), identifying a weapon system by means of a scanning laser system which uses retroreflections of the sighting optics (so-called glint detectors), identifying an approaching guided missile by means of the missile warning system, and identifying a laser controlled missile (so called beam rider) by means of a laser warning system.

Identifying a sniper by the scanning laser system may for example be performed in a way that the laser system is only used to identify the sniper. Optionally, the laser of the scanning laser system may also be used to jam the sniper (that is, the laser is used as a jamming signal 125). The same applies for recognizing a weapon system, wherein also a separate laser scanning system may be leveraged or also the same system may be leveraged, which is used for jamming the target acquisition (that is the jamming signal).

In further exemplary embodiments, the optical jammer 120 is configured to perform a self-protection of land vehicles, flying platforms, or water vehicles, or for protecting objects as a separate device in order to protect endangered objects, as for example warehouses, airports, land vehicles without any protection, etc.

The features of the invention disclosed in the specification, the claims and in the figures may be each individually or in any combination substantial for realizing the invention.

LIST OF REFERENCE NUMBERS

10 Shooter/object/optical sight device of a target acquisition unit
50 Detector

100 System for jamming target acquisition
105 Detection signal
110 Warning device
115 Warning
120 Optical jammer
125 Jamming signal
130 Directing device
140 Background spectrum analyzer

The invention claimed is:

1. A system for jamming a target acquisition, which starts at a position and is detectable by detector, wherein the detector provides a detection signal in response to the target acquisition, the system comprising:
a warning device for outputting a warning based on the detection signal;
an optical jammer configured to provide at least one jamming signal; and
a directing device configured to direct the jamming signal towards the position in response to the output warning in order to prevent the target acquisition or to make target acquisition at least more difficult,
wherein the optic jammer is configured to provide a multispectral light signal, in particular a pulsed or continuous laser signal, as the jamming signal, wherein the optical jammer is further configured to provide the jammer signal having a wavelength which is variable by switchable wavelengths.

2. The system according to claim 1, wherein the optical jammer is configured to provide the jamming signal having a wavelength or intensity or pulse rate which results in contrast reduction during target acquisition and is in the visible or infrared spectral range.

3. The system according to claim 2, further comprising:
a device for determining a spectral range of a radiation from a spatial region which is opposite to a direction towards which the directing device is adapted to direct the jamming signal,
wherein the optical jammer is configured to change the jamming signal depend-ing on the determined spectral range.

4. The system according to claim 3, wherein
the directing device is configured to track stationary, flying, and moving objects during the movement thereof, and to direct the jamming signal towards the mov-ing object for a minimum period of time, and/or which is further configured to conceal a position of at least one component of the system by beam deflection.

5. The system according to claim 2, further comprising:
a distance meter device configured to determine a distance to the position,
wherein the optical jammer is configured to change the jamming signal depend-ing on the measured distance.

6. The system according to claim 2, wherein
the directing device is configured to track stationary, flying, and moving objects during the movement thereof, and to direct the jamming signal towards the mov-ing object for a minimum period of time, and/or which is further configured to conceal a position of at least one component of the system by beam deflection.

7. The system according to claim 1, further comprising:
a device for determining a spectral range of a radiation from a spatial region which is opposite to a direction towards which the directing device is adapted to direct the jamming signal,
wherein the optical jammer is configured to change the jamming signal depend-ing on the determined spectral range.

8. The system according to claim 7, further comprising:
a distance meter device configured to determine a distance to the position,
wherein the optical jammer is configured to change the jamming signal depend-ing on the measured distance.

9. The system according to claim 7, wherein
the directing device is configured to track stationary, flying, and moving objects during the movement thereof, and to direct the jamming signal towards the mov-ing object for a minimum period of time, and/or which is further configured to conceal a position of at least one component of the system by beam deflection.

10. The system according to claim 1, further comprising:
a distance meter device configured to determine a distance to the position,
wherein the optical jammer is configured to change the jamming signal depend-ing on the measured distance.

11. The system according to claim 1, wherein
the directing device is configured to track stationary, flying, and moving objects during the movement thereof, and to direct the jamming signal towards the mov-ing object for a minimum period of time, and/or which is further configured to conceal a position of at least one component of the system by beam deflection.

12. The system according to claim 1, wherein the detector is a component of the system.

13. The system according to claim 1, further comprising at least one of:
a muzzle fire detector,
a missile warning unit for detecting approaching flying objects,
a laser warning system for detecting laser-guided mis-siles, and/or
a scanning laser system for detecting a sighting device by retroreflection of an emitted laser beam.

14. The system according to claim 13, wherein
the scanning laser system is configured to provide a laser beam as a jamming signal, or
the optical jammer, the directing device, and the detector are configured as the scanning laser system.

15. A method for jamming a target acquisition, which starts at a position and is detectable by detector, wherein the detector provides a detection signal in response to the target acquisition, comprising the following acts:
outputting a warning, in case the detector outputs a detection signal; and
in response to outputting the warning, directing a jam-ming signal towards the position to prevent target acquisition or to make target acquisition at least more complicate,
wherein the optic jammer is configured to provide a multispectral light signal, in particular a pulsed or continuous laser signal, as the jamming signal, wherein the optical jammer is further configured to provide the jammer signal having a wavelength which is variable by switchable wavelengths.

* * * * *